March 1, 1960

C. W. BAKER ET AL 2,926,697

ROTARY CONTROL VALVE

Filed June 10, 1957

INVENTORS.
CLYDE W. BAKER
AND HENRY MERLE HANFORD
BY
Attorney

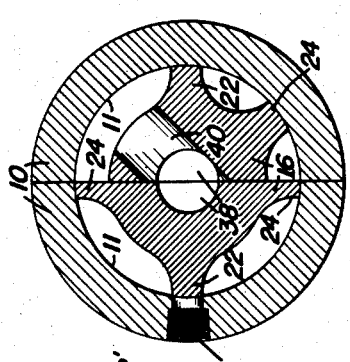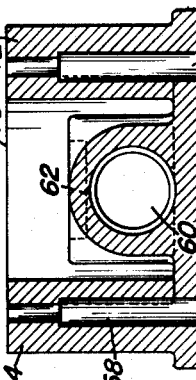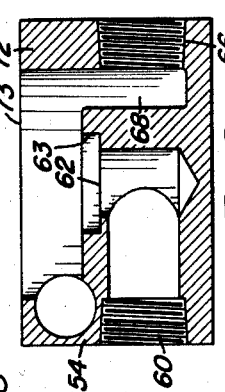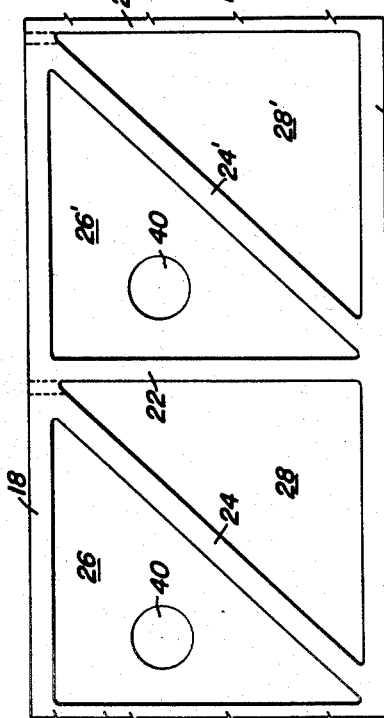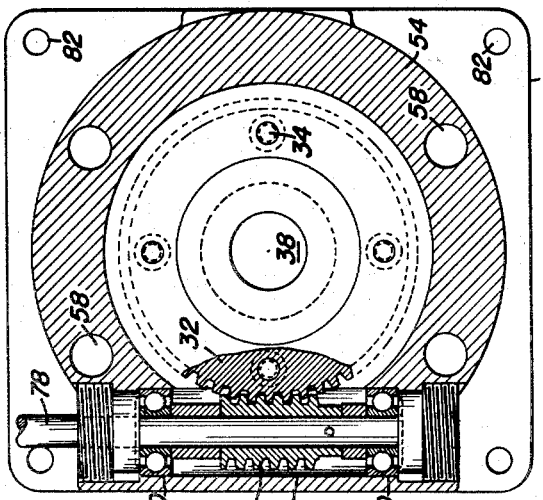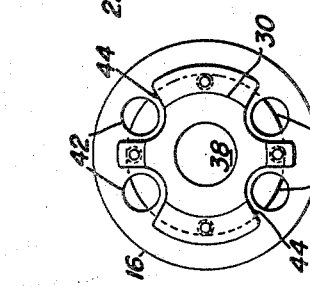

United States Patent Office 2,926,697
Patented Mar. 1, 1960

2,926,697

ROTARY CONTROL VALVE

Clyde W. Baker and Henry Merle Hanford, Rochester, N.Y., assignors of one-half to Genesee Machine Builders, Inc., Irondequoit, N.Y., and one-half to V.I. Products, Inc., Rochester, N.Y., both corporations of New York Application June 10, 1957, Serial No. 664,624

4 Claims. (Cl. 137—624)

This invention relates to a rotary valve for control of the direction of flow of fluid between a fluid supply pump and a fluid-operated device.

An object of the invention is to provide a rotary valve by which the time and direction of movement of a fluid-pressure operated piston or other device may be controlled.

Another object of the invention is to provide a rotary control valve that may be used to control any desired number of fluid-operated devices simultaneously.

Another object of the present invention is to provide a rotary control valve by which a plurality of separate fluid-operated devices can be controlled simultaneously as to time and direction of operation.

Other objects of the invention will become obvious to those skilled in the art from consideration of the following detailed description of the invention and from a consideration of the drawings which show a specific embodiment thereof.

In the specific embodiment of the invention illustrated in the drawings, a valve body is provided that has a bore therein that has a closed upper end and an open lower end. A spool is rotatably mounted in the bore and is formed with a rim at each end thereof that engages the wall of the bore. The spool is formed with four partition vanes, two of which are axially-extending and diametrically-opposed, and the other two of which are helical, parallel, and 180° apart. The helical vanes each interconnect an end of one axially-extending vane with the opposite end of the other axially-extending vane, to form four separate compartments. Each vane engages the wall of the bore, so that the individual compartments are separated from each other in fluid-tight fashion.

The spool is formed with an axial inlet duct that extends upward from the bottom of the spool for about two-thirds of the length of the spool, and then joins a transverse duct that extends diametrally of the spool. The transverse duct opens at each end thereof into two of the compartments. Fluid under pressure is supplied from a pump or other source to the axial duct, and to these two compartments. The other two compartments are connected to a discharge or exhaust line by ducts that extend through one end rim of the spool and that are continuously connected with a main exhaust duct in the valve body.

The valve body can be provided with any desired number of ports that are connected with different fluid-pressure operated devices so as to connect the devices with supply and exhaust as the spool is rotated.

The spool can be driven in any suitable manner, as by a gear that is secured on the spool at its lower end, and can be driven at a constant speed or at variable speeds.

In operation of the valve, fluid under pressure is pumped into the valve, through the axial and transverse ducts in the spool, and into two of the compartments. As the spool rotates, one of these compartments is moved into registry with a given port in the wall of the valve body, so that pressure fluid flows from that compartment through the port to the device which is to be actuated. As the spool continues to rotate, the next succeeding compartment, which is on exhaust, is brought into registry with the port, and the fluid is exhausted from the device through the port. As the rotation of the spool continues, the other compartment, which is on supply, comes into registry with the port, and the device is again put on supply. Then the second of the compartments which are on exhaust, is brought into registry with the port, and the device is put on exhaust. So the cycle continues; as the spool rotates, each port is alternately put on supply and exhaust. By providing a plurality of ports, several devices, such as several fluid-pressure operated pistons, can be controlled from this single rotating valve. The axial spacing of the ports determines the period of operation of the several devices, and the circumferential spacing of the ports determines the sequence of operation.

The details of the invention will be best understood by reference to the following description, taken together with the drawings.

In the drawings:

Fig. 3 is a bottom plan view of the spool on a reduced scale;

Fig. 4 is a developed view of the spool on a reduced scale;

Fig. 5 is a section taken on the line 5—5 of Fig. 1, looking in the direction of the arrows;

Fig. 6 is a section taken on the line 6—6 of Fig. 1, looking in the direction of the arrows;

Fig. 7 is a top plan view of the closure block on a reduced scale;

Fig. 8 is a section taken on the line 8—8 of Fig. 7, looking in the direction of the arrows; and Fig. 9 is a section taken on the line 9—9 of Fig. 7, looking in the direction of the arrows.

Figure 2:
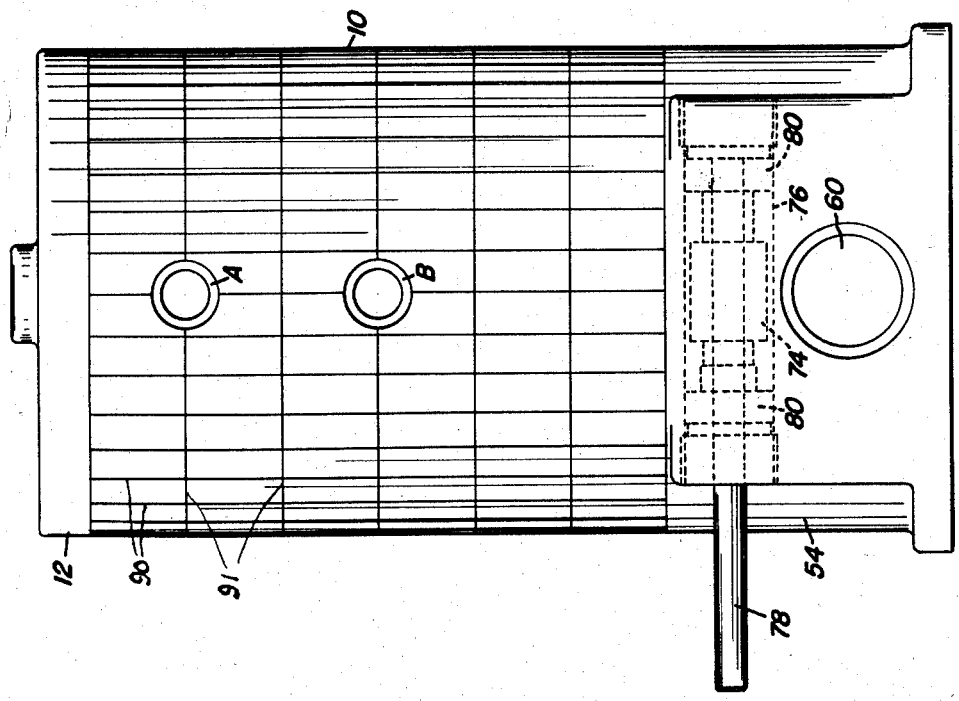
Fig. 2 is a front elevation thereof.

Referring now in detail to the drawings, the control valve is constructed from a housing 10 having a bore or chamber 11 that is closed at its upper end by a plate 12 that is secured on the housing 10 by a plurality of screws 14. In the embodiment shown, the housing 10 is formed with two threaded ports A and B formed through its wall to open into the bore 11 thereof, and these ports are aligned axially of the housing. A spool 16 having an upper rim 18 and a lower rim 20 is mounted in the bore 11.

The rims 18, 20, of the spool are of a diameter to engage the inside surface of the bore of the housing 10; and, since the rims are of larger diameter than the shank of the spool, a space is formed between the shank of the spool and the bore 11. A pair of diametrically opposed, axially extending partition vanes 22, 22', are formed on the spool, and extend between the rims 18, 20. A pair of helical partition vanes 24, 24', each having the same helical pitch and hand, are also formed on the spool, spaced 180° apart. Each helical vane interconnects an end of one axially-extending vane with the opposite end of the other axially-extending vane. In this way, a pair of upper compartments 26, 26' and a pair of lower compartments 28, 28' are formed within the space between the shank of the spool and the inside of the bore of the housing 10. Each of the vanes engages the wall of the bore 11, so that the several individual compartments are separated from each other.

The spool is formed at its lower end, below the lower rim 20, with a scalloped peripheral surface 44 and with a reduced extension or boss 30. A gear 32 is secured about the boss by a plurality of screws 34. The spool is further reduced at its lower end below the boss 30 to provide a journal 36. The spool is also formed with a duct 38 that extends axially from the journal 36 more than half way up the spool, and there joins a transverse duct 40 that opens at each end thereof into each of the two upper compartments 26, 26'.

Figure 1:
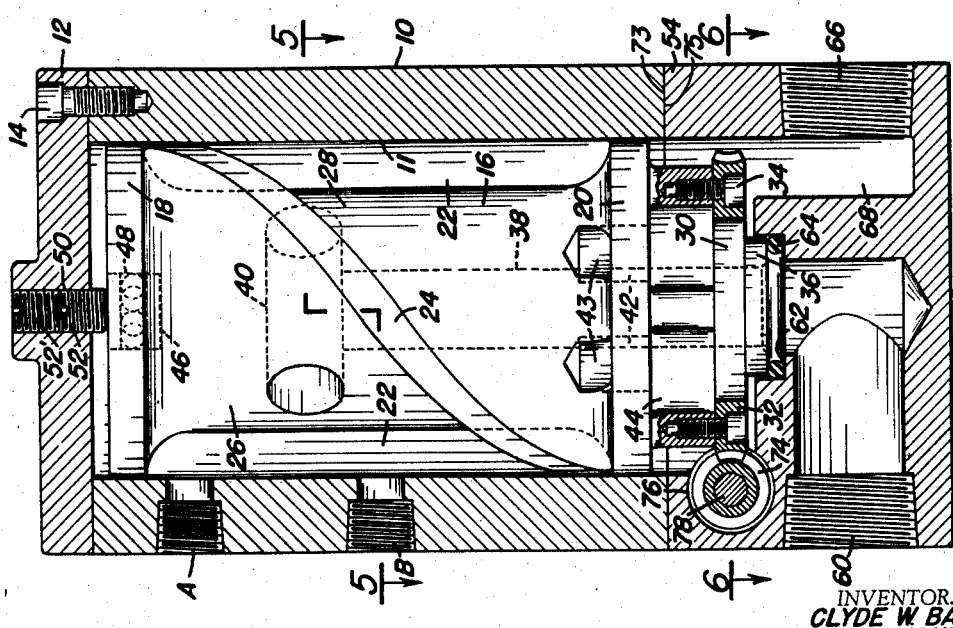
Fig. 1 is an axial section of a control valve constructed according to one embodiment of this invention.

The lower rim 20 is bored, and the adjacent surface areas 43 of the spool 16 above this rim are hollowed out, to provide ducts 42 (Figs. 1 and 3) which communicate with the arcuate space 68 in the closure block 54 around and below the boss 30, as will be described further hereinafter, to exhaust the fluid from the lower compartments 28, 28'.

The upper end of the spool 16 is bored to provide a recess 46 to receive a thrust bearing 48. The end plate 12 is centrally apertured to provide a threaded hole 50 within which a set screw 52 can be adjustably engaged to abut against the bearing 48 when the spool 16 is engaged in the bore 11. If desired, a second screw 52' may be provided to engage against the set screw 52 to lock it in place.

A closure block 54 is secured over the lower end of the bore 11 of the housing 10, and is fastened in place by a plurality of screws (not shown) that are engaged in apertures 58 (Fig. 9) in the block. The closure block 54 is formed with an inlet duct 60 that is adapted to be connected at its outer end to a pump (not shown). At its inner end, the inlet duct 60 is directed axially of the spool 16 and is coaxial with and communicates with the axial duct 38 in the spool. The block 54 is recessed or counterbored above the inlet duct 60 to provide a shoulder 62 and bearing 63. The bearing 63 is proportioned loosely to receive the journal 36 of the spool. An O-ring 64 is seated on the shoulder 62 and is engaged by the lower end of the journal 36 to form a fluid-tight seal. Pressure can be applied against this seal by adjustment of the screw 52.

The block 54 is also formed with an outlet duct 66, that is adapted to be connected to a sump tank if the valve is used in a hydraulic system, or to the atmosphere if the valve is used in a pneumatic system. The horseshoe-shaped recess 68 formed in the interior of the block 54 interconnects the outlet port 66 in the block with the outlet ducts 42 in the spool. The wall 72 of the block has a plane top face 73 that engages against the lower plane face 75 of the cylindrical body 10.

A worm 74 is mounted in a recess 76 in the block 54 on a shaft 78 that is extended out of the block, and that is journaled within the block in a pair of bearings 80. To drive the gear 32 and the spool 16, the shaft 78 may be connected to any convenient source of power, or may be connected to a crank for manual operation.

A plurality of apertures 82 are formed in the base 83 of the block 54 to receive fasteners to secure the valve to a supporting surface.

To operate the valve, the spool is caused to rotate by rotation of the shaft 78, worm 74, and gear 32. Fluid, such as compressed air, is continuously supplied under pressure to the inlet duct 60, through which it passes into the axial duct 38 in the spool, and out through the transverse duct 40 into the two upper compartments 26. As the compartment 26 registers with the two ports A and B, the motive fluid under pressure is supplied simultaneously through the two ports A and B to the fluid-operated devices that are connected thereto. When the helical vane 24 registers with the port B, further communication between this port and the upper compartment 26 ceases. As the spool rotates further, the port B communicates with the lower compartment 28. The fluid then exhausts from the fluid-operated device, that is connected with the port B, into the lower compartment 28, and from the lower compartment 28, through the recesses 43, the holes 42, the horseshoe-shaped recess 68 in the block 54, to the outlet duct 66.

With the construction shown, the upper port A remains in registry with and connected with the upper compartment 26 after the lower port B is disconnected therefrom. Thus, the device that is connected to the upper port A continues to be supplied with air under pressure for a longer period of time than is the case with the device that is connected to the port B. Eventually, however, as the spool 16 continues to be rotated, the helical vane 24 moves to cut off the port A also, and this port then also becomes connected with the lower compartment 28.

Then, as the spool continues to be rotated, the axially-extending vane 22 registers with both ports A and B simultaneously, since they are aligned vertically in the instance shown, and the two ports are then simultaneously shut off. As the spool continues to rotate, however, both ports come into communication with the second upper compartment 26'. This puts both ports again on pressure. Each port continues on pressure until the vane 24' registers with it. Then it is put on exhaust through compartment 28'. In this way, the cycle continues, so that the ports A and B successively communicate, first with an upper compartment on supply, then with a lower compartment on exhaust.

Obviously, the spool can be rotated in the reverse direction, to obtain different operating characteristics and timing with the same connections.

The foregoing description has been confined to a single specific embodiment of the invention, but it will be appreciated by those skilled in the art that many modifications may be made that are nevertheless within the spirit and scope of the invention. The surface of the spool may be formed to provide only a single upper compartment and a single lower compartment, or as many upper and as many lower compartments as are desired; and as many ports may be formed in the wall of the cylindrical body as are required to operate the pistons or other devices that are to be controlled thereby.

Any number of ports may be provided in the housing and these may be positioned axially and angularly of the spool in any desired arrangement. The axial arrangement determines the length of time during which any single port is in registry with the pressure and exhaust compartments respectively. The circumferential positions of the ports determine the sequence of operation when a plurality of devices, such as pistons, are operated under control of the single valve shown. As shown in Fig. 2, the outer surface of the cylindrical body 10 may be scribed with a grid of vertical lines 90 and horizontal circles 91, if desired, to facilitate the drilling or boring of the ports in the desired positions in the housing.

When the valve is used to control the reciprocatory movements of pneumatically-operated pistons each of which is spring-pressed in one direction by a spring mounted on one side of the piston, the valve will control the supply and exhaust connections to the other side of the piston. When the valve is used to control the reciprocatory movements of double-acting pistons that are moved in both directions by fluid under pressure, then for each piston two port connections must be provided in the valve housing, the two ports being equispaced from the central transverse plane of the valve spool and being disposed on opposite sides of this plane, and angularly spaced apart by 90°, so that one side of each piston is on pressure while the other side of the piston is on exhaust.

Obviously, a great many applications of the valve are possible. For example, where a plurality of piston-type devices are controlled from a single valve constructed according to the present invention, the hydraulic or pneumatic circuits can be interlocked together through a piston controlled by the valve which will stop the drive motor for the valve until any desired piston or pistons had completed its or their movement. Also, the valve spool could be driven at a controlled, variable speed, for further control of the timing and of the sequence of the various devices. Other applications for the valve will occur to those skilled in the art.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention what we claim is:

1. A rotary valve comprising a body having a chamber therein, a spool rotatably mounted in said chamber and having a rim adjacent each end thereof that engages the wall of said chamber, two axially-extending, spaced vanes mounted on the peripheral surface of said spool and each interconnecting said rims, a pair of helical vanes mounted on the peripheral surface of said spool and each interconnecting said rims at the juncture of each rim and the axially-extending vanes, each said vane engaging the wall of said chamber whereby said vanes form with said rims an upper pair and a lower pair of separate compartments spaced about the axis of said spool, said body being formed with a pair of ducts and with at least one port that communicates through the wall of said chamber with a confronting compartment, means to connect one said duct to at least one pair of said compartments, and means to connect said other duct to said other pair of compartments, whereby when said spool is rotated said port communicates successively with said ducts.

2. A rotary valve comprising a body having a chamber therein, a spool rotatably mounted in said chamber and having a rim adjacent each end thereof that engages the wall of said chamber, two axially-extending, diametrically-opposed vanes mounted on the peripheral surface of said spool and each interconnecting said rims, a pair of helical vanes mounted on the peripheral surface of said spool and spaced 180° apart and interconnecting said rims at the juncture of each rim and the axially-extending vanes, each said vane engaging the wall of said chamber whereby said vanes form with said rims an upper pair and a lower pair of separate compartments spaced about the axis of said spool, said body being formed with an inlet duct, an outlet duct, and at least one port that communicates through the wall of said chamber with a confronting compartment, means to connect said inlet duct to at least one selected pair of said compartments, and means to connect said outlet duct to the other pair of said compartments, whereby when said spool is rotated said port communicates consecutively with said outlet and inlet ducts.

3. A rotary valve comprising a body having a cylindrical bore therein, a spool rotatably mounted in said bore and having a rim adjacent each end thereof that engages the wall of said bore, a pair of axially-extending, diametrically-opposed vanes mounted on the peripheral surface of said spool and each interconnecting said rims, a pair of helical vanes mounted on the peripheral surface of said spool and each interconnecting said rims at the juncture of each rim and the axially-extending vanes, said helical vanes having the same helical pitch and hand, each said vane engaging the wall of said bore whereby said vanes form with said rims an upper pair and a lower pair of separate compartments, respectively, spaced about the axis of said spool, said body being formed with at least one port that communicates with a confronting compartment, a closure block mounted over the open end of said bore and formed with an inlet duct and an outlet duct, said spool having an axial passage that communicates at one end thereof with the upper pair of said compartments and at the other end thereof with one of the ducts in said block, the rim of said spool adjacent said block and in said lower compartments being apertured to provide at least one hole for each said lower compartment, said block being formed with a circumferential opening that communicates with said other duct and with said hole, whereby when said spool is rotated said port communicates consecutively with said outlet and inlet ducts.

4. A valve comprising a body having a cylindrical bore, a spool rotatably mounted in said bore and having a rim adjacent each end thereof that engages the inside wall of said bore, a pair of axially-extending, diametrically opposed vanes mounted on the peripheral surface of said spool and each interconnecting said rims, a pair of helical vanes mounted on the peripheral surface of said spool and each interconnecting said rims at the juncture of each rim and said axially-extending vanes, said helical vanes being spaced 180° apart, each said vane engaging the inside wall of said bore whereby said vanes form with said rims an upper pair and a lower pair of separate compartments, respectively, spaced about the axis of said spool, said body being formed with a plurality of mutually spaced ports that communicate with said bore, an inlet duct, means to provide communication between said inlet duct and one pair of said compartments, an outlet duct, and means to provide communication between said outlet duct and the other pair of said compartments, whereby when said spool is rotated each said port communicates successively with said inlet duct and said outlet duct.

References Cited in the file of this patent

UNITED STATES PATENTS

| | | |
|---|---|---|
| 1,429,415 | Evans | Sept. 19, 1922 |
| 2,818,881 | Bonner et al. | Jan. 7, 1958 |